United States Patent
Bent et al.

(10) Patent No.: US 10,570,852 B2
(45) Date of Patent: Feb. 25, 2020

(54) MOVEABLE EXHAUST PLUG LINER

(71) Applicant: United Technologies Corporation, Farmington, CT (US)

(72) Inventors: Andre L. Bent, East Hartford, CT (US); Steven H. Zysman, Amston, CT (US); Nigel David Sawyers-Abbott, South Glastonbury, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 316 days.

(21) Appl. No.: 15/711,229

(22) Filed: Sep. 21, 2017

(65) Prior Publication Data
US 2019/0085789 A1  Mar. 21, 2019

(51) Int. Cl.
| | |
|---|---|
| *F02K 1/06* | (2006.01) |
| *F02K 1/08* | (2006.01) |
| *F02K 1/56* | (2006.01) |
| *F02C 9/18* | (2006.01) |
| *F02K 1/32* | (2006.01) |

(52) U.S. Cl.
CPC ........... *F02K 1/566* (2013.01); *F02C 9/18* (2013.01); *F02K 1/06* (2013.01); *F02K 1/08* (2013.01); *F02K 1/085* (2013.01); *F02K 1/32* (2013.01); *F05D 2220/32* (2013.01); *F05D 2240/1281* (2013.01); *F05D 2260/606* (2013.01)

(58) Field of Classification Search
CPC ....... F02K 1/06; F02K 1/08; F05D 2240/1281
See application file for complete search history.

(56) References Cited

U.S. PATENT DOCUMENTS

| | | | |
|---|---|---|---|
| 2,514,393 | A | 7/1950 | Hutchinson |
| 2,828,603 | A | 4/1958 | Laucher |
| 2,847,822 | A | 8/1958 | Hausmann |
| 3,386,247 | A | 6/1968 | Gross et al. |
| 3,570,769 | A | 3/1971 | Freeman |

(Continued)

FOREIGN PATENT DOCUMENTS

| | | |
|---|---|---|
| GB | 835134 | 5/1960 |
| GB | 1116779 A | 6/1968 |
| WO | 03060311 A1 | 7/2003 |

OTHER PUBLICATIONS

European Search Report Issued in EP Application No. 18177104.9, dated Nov. 7, 2018, 8 pages.

(Continued)

*Primary Examiner* — Todd E Manahan
*Assistant Examiner* — Alyson Joan Harrington
(74) *Attorney, Agent, or Firm* — Cantor Colburn LLP

(57) ABSTRACT

An exhaust section of a gas turbine engine includes an exhaust plug defining a plurality of exhaust plug apertures circumferentially spaced from each other. Also included is an exhaust nozzle radially offset from the exhaust plug defining an exhaust pathway between the exhaust plug and the exhaust nozzle. Further included is an exhaust plug liner having a non-uniform outer surface axially aligned with the exhaust plug apertures. The exhaust plug liner is rotatable relative to the exhaust plug between a first position and a second position to selectively change a cross-sectional area of the exhaust pathway during thrust reversal operation to reduce an amount of reverse thrust necessary.

20 Claims, 7 Drawing Sheets

(56) References Cited

U.S. PATENT DOCUMENTS

| | | | |
|---|---|---|---|
| 3,841,091 A | 10/1974 | Sargisson et al. | |
| 4,527,388 A | 7/1985 | Wallace, Jr. | |
| 4,592,508 A | 6/1986 | Thornock | |
| 4,802,629 A | 2/1989 | Klees | |
| 4,909,346 A | 3/1990 | Torkelson | |
| 6,845,607 B2 * | 1/2005 | Lair | F02C 9/18 181/213 |
| 8,286,415 B2 | 10/2012 | Kohlenberg | |
| 2003/0150214 A1 * | 8/2003 | Lair | F02C 9/18 60/771 |
| 2008/0112801 A1 | 5/2008 | Moniz et al. | |
| 2017/0218975 A1 | 8/2017 | Bintz et al. | |
| 2018/0355821 A1 | 12/2018 | Bent et al. | |

OTHER PUBLICATIONS

Search Report regarding related EP App. No. 18196110.3; dated Jan. 18, 2019; 7 pgs.

* cited by examiner

MOVEABLE EXHAUST PLUG LINER

BACKGROUND

Exemplary embodiments pertain to the art of gas turbine engines, and more particularly to exhaust nozzles of gas turbine engines.

Large aircraft, such as multiengine aircraft utilizing high bypass gas turbine engines, utilize fan thrust reversers to slow and stop the aircraft upon landing or in other instances, such as an aborted takeoff. The gas turbine engine is spooled up to increase power output to provide the thrust utilized by the fan thrust reverser, a forward component of thrust, or core thrust, is still provided, via the core of the gas turbine engine, and as thrust is increased to power the fan thrust reverser, the core thrust proportionally increases as well.

It is desired to reduce the size and weight of fan thrust reversers to reduce initial cost and also operating costs of the aircraft. Since to slow and stop the aircraft as desired the fan thrust reverser must overcome the forward momentum of the aircraft as well as the core thrust, lowering the core thrust component that must be overcome by the fan thrust reverser may lead to a reduction in fan thrust reverser size and/or weight.

BRIEF DESCRIPTION

Disclosed is an exhaust section of a gas turbine engine. The exhaust section includes an exhaust plug defining a plurality of exhaust plug apertures circumferentially spaced from each other. Also included is an exhaust nozzle radially offset from the exhaust plug defining an exhaust pathway between the exhaust plug and the exhaust nozzle. Further included is an exhaust plug liner having a non-uniform outer surface axially aligned with the exhaust plug apertures. The exhaust plug liner is rotatable relative to exhaust plug between a first position and a second position to selectively change a cross-sectional area of the exhaust pathway during thrust reversal operation to increase an amount of reverse thrust.

In addition to one or more of the features described above, or as an alternative, further embodiments may include that the non-uniform outer surface of the exhaust plug liner is disposed along a single axial location of the exhaust plug liner.

In addition to one or more of the features described above, or as an alternative, further embodiments may include that the non-uniform surface comprises at least one of a plurality of protrusions and recesses along the outer surface of the exhaust plug liner.

In addition to one or more of the features described above, or as an alternative, further embodiments may include that the exhaust plug includes an end portion tapering to a plug tip.

In addition to one or more of the features described above, or as an alternative, further embodiments may include that the end portion is conical.

In addition to one or more of the features described above, or as an alternative, further embodiments may include an axially-extending portion of the exhaust plug extending from the end portion.

In addition to one or more of the features described above, or as an alternative, further embodiments may include that the axially-extending portion is cylindrical.

In addition to one or more of the features described above, or as an alternative, further embodiments may include that at least one actuator drives rotation of the exhaust plug liner.

In addition to one or more of the features described above, or as an alternative, further embodiments may include that the at least one actuator is one or more pneumatic or electric actuators.

In addition to one or more of the features described above, or as an alternative, further embodiments may include that rotation of the exhaust plug between the first position and the second position changes the cross-sectional area of the exhaust pathway by between 10% and 20%.

Also disclosed is a gas turbine engine including a fan section defining a fan airflow pathway. Also included is a combustor section. Further included is a turbine section in fluid communication with the combustor section. Yet further included is an exhaust section in fluid communication with the turbine section. The exhaust section includes an exhaust plug defining a plurality of exhaust plug apertures circumferentially spaced from each other. The exhaust section also includes an exhaust nozzle radially offset from the exhaust plug defining an exhaust pathway between the exhaust plug and the exhaust nozzle. The exhaust section further includes an exhaust plug liner having a non-uniform outer surface axially aligned with the exhaust plug apertures. The exhaust plug liner is rotatable relative to exhaust plug between a first position and a second position to selectively change a cross-sectional area of the exhaust pathway during thrust reversal operation to increase an amount of reverse thrust.

In addition to one or more of the features described above, or as an alternative, further embodiments may include that the non-uniform outer surface of the exhaust plug liner is disposed along a single axial location of the exhaust plug liner.

In addition to one or more of the features described above, or as an alternative, further embodiments may include that the non-uniform surface comprises at least one of a plurality of protrusions and recesses along the outer surface of the exhaust plug liner In addition to one or more of the features described above, or as an alternative, further embodiments may include that the exhaust plug includes an end portion tapering to a plug tip.

In addition to one or more of the features described above, or as an alternative, further embodiments may include that the end portion is conical.

In addition to one or more of the features described above, or as an alternative, further embodiments may include an axially-extending portion of the exhaust plug extending from the end portion.

In addition to one or more of the features described above, or as an alternative, further embodiments may include that the axially-extending portion is cylindrical.

In addition to one or more of the features described above, or as an alternative, further embodiments may include that at least one actuator drives rotation of the exhaust plug liner.

In addition to one or more of the features described above, or as an alternative, further embodiments may include that rotation of the exhaust plug liner between the first position and the second position changes the cross-sectional area of the exhaust pathway by between 10% and 20%.

Further disclosed is a method of operating a gas turbine engine. The method includes actuating a fan thrust reverser to divert a fan airflow from a fan airflow pathway. The method also includes rotating an exhaust plug liner, relative to an exhaust plug, from a first position to a second position, thereby increasing a cross-sectional area of an exhaust pathway to increase an amount of reverse thrust.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
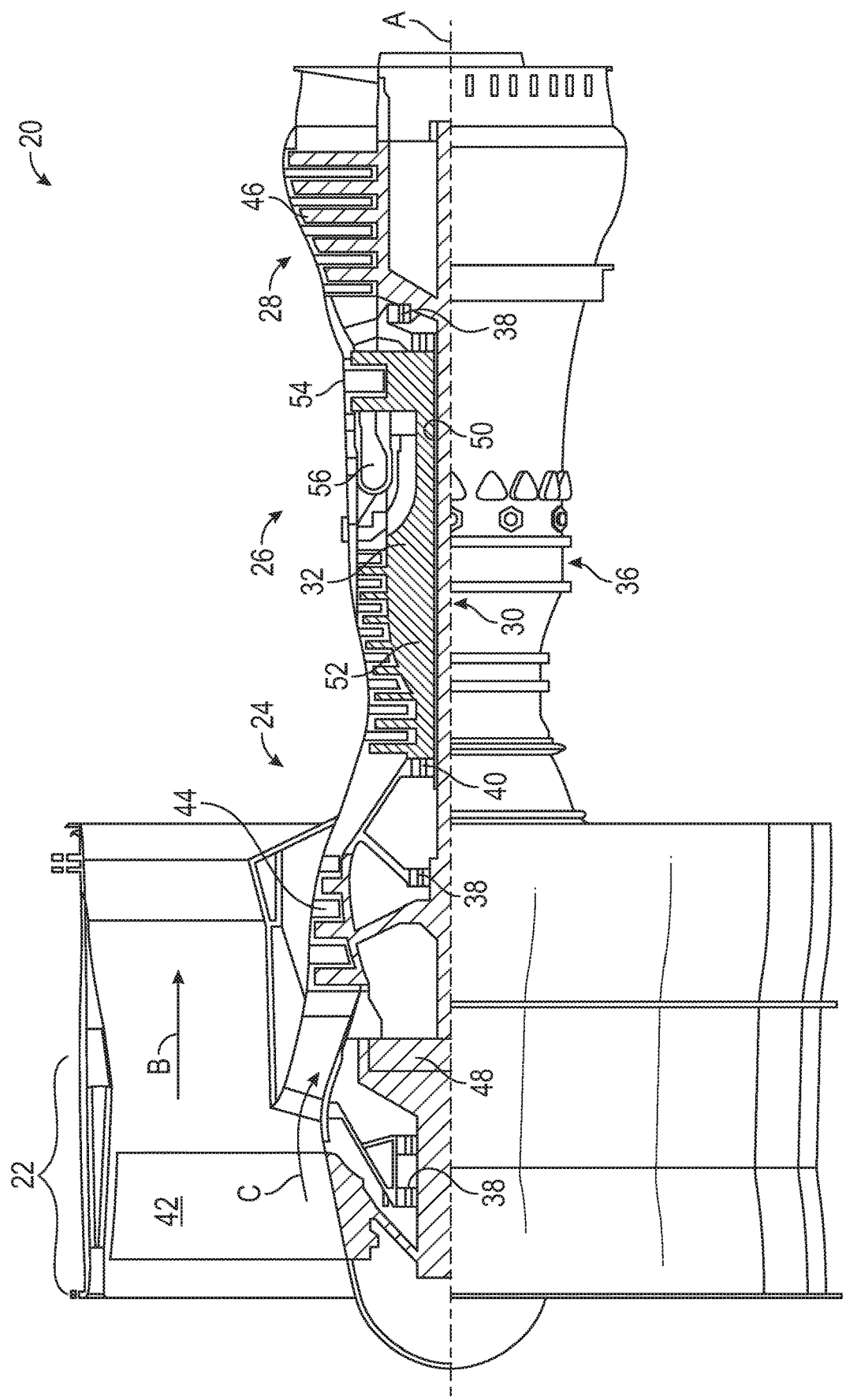
FIG. 1 is a cross-sectional view of an embodiment of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five (5:1). Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is optimized for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm/s of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 m/sec).

Figure 2:
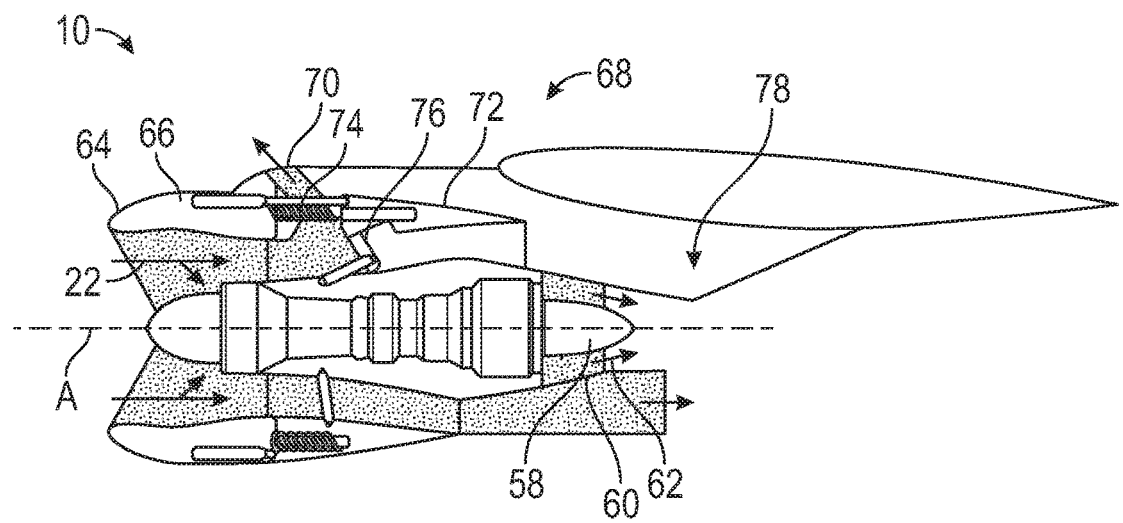
FIG. 2 is an exploded view of an embodiment of a gas turbine engine system.

Referring now to FIG. 2, in some embodiments the gas turbine engine 10 includes an exhaust plug 58 and an exhaust nozzle 60 defining a pathway for the exhaust of combusted core airflow, or core thrust 62. Further, the gas turbine engine 10 includes an inlet 64 and a fan cowl 66 to enclose the fan section 22. A fan thrust reverser 68 is included at the gas turbine engine 10 to divert fan airflow 70 radially outwardly and forward during a landing event of an aircraft on which the gas turbine engine 10 is utilized to slow and or stop forward motion of the aircraft. This is achieved by moving a translating sleeve 72 of the fan thrust reverser 68 rearward, which exposes cascade vanes 74, as shown in an upper portion of FIG. 2, while a lower portion of FIG. 2 illustrates the translating sleeve 72 in a stowed position. When the translating sleeve 72 is moved rearward, blocker door assemblies 76 are extend across fan flowpath B, thus diverting the fan airflow 70 outwardly and in an upstream direction through the cascade vanes 74. To slow the aircraft, the diverted fan airflow 70 must overcome not only the forward momentum of the aircraft, but also the core thrust 62.

Figure 3:
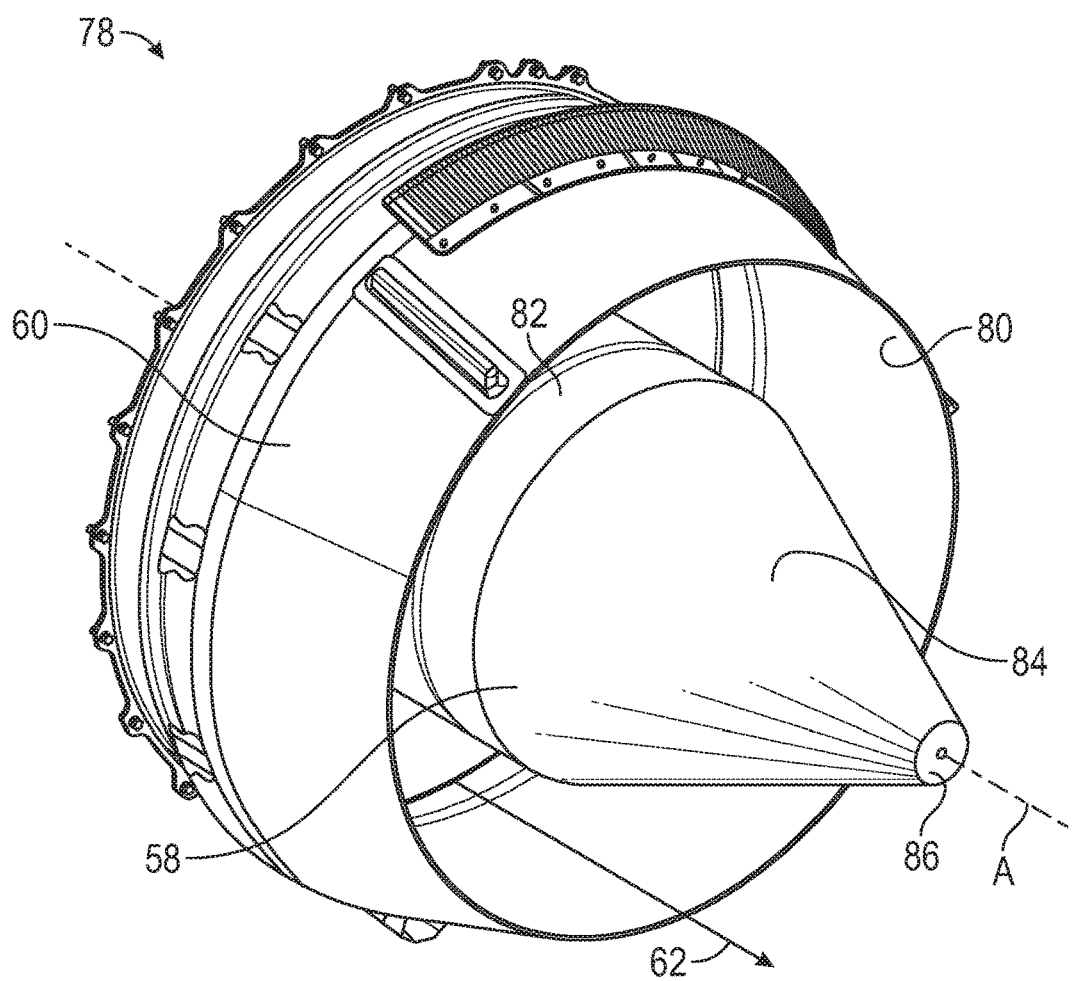
FIG. 3 is a perspective view of an embodiment of an exhaust section of a gas turbine engine.

Referring now to FIG. 3, illustrated is an embodiment of an exhaust section 78 of the gas turbine engine 20, including the exhaust plug 58 located at the engine central longitudinal axis A, and an exhaust nozzle 60. The exhaust nozzle 60 surrounds the exhaust plug 58 and is offset from the exhaust plug 58 in a radial direction to define an exhaust pathway 80 between the exhaust plug 58 and the exhaust nozzle 60 through which core thrust 62 is flowed before exiting to the atmosphere. To reduce the amount of core thrust 62 relative to the fan airflow 70 during a landing operation, a cross-sectional area of the exhaust pathway 80 is increased, as described below. This increases an expansion ratio across the turbine section 28, thus resulting in a lower a discharge velocity and thus core thrust 62 relative to the fan airflow 70.

The exhaust plug 58 has an axially-extending portion 82, which in some embodiments is substantially cylindrical, and an end portion 84 extending from the axially-extending portion 82. In some embodiments, the end portion 84 tapers to a plug tip 86 defining a downstream end of the exhaust plug 58. In some embodiments the end portion 84 is conical in shape.

Figure 4:
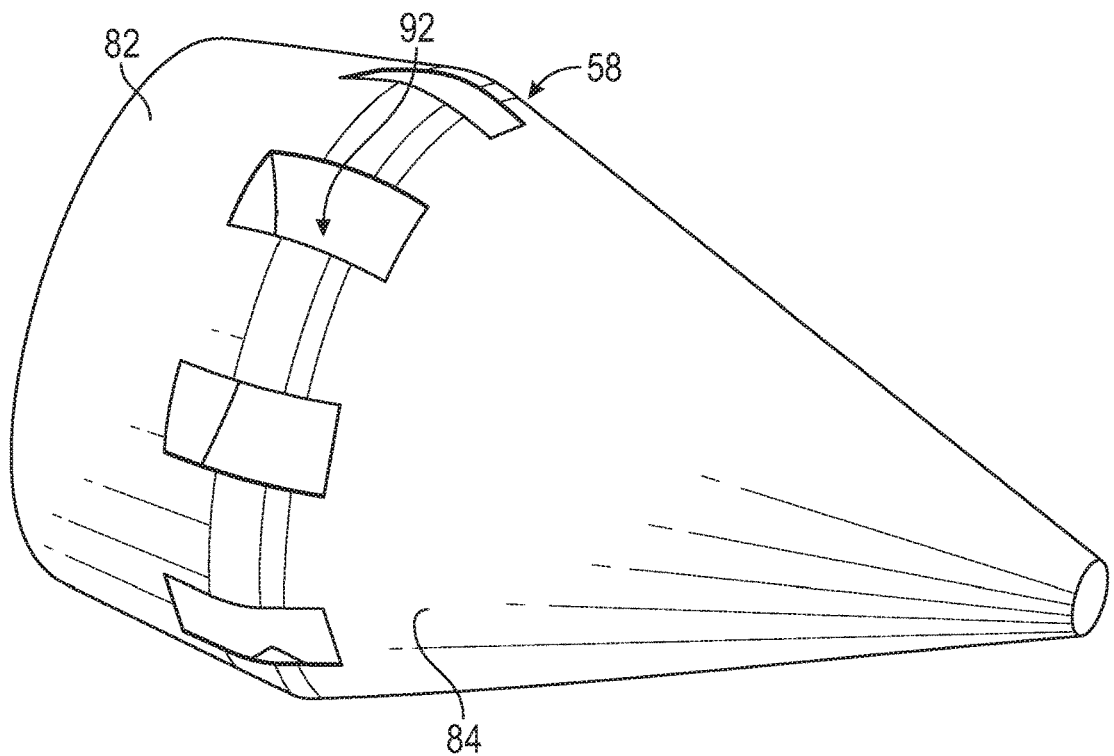
FIG. 4 is a perspective view of an exhaust plug of the exhaust section.
Figure 5:
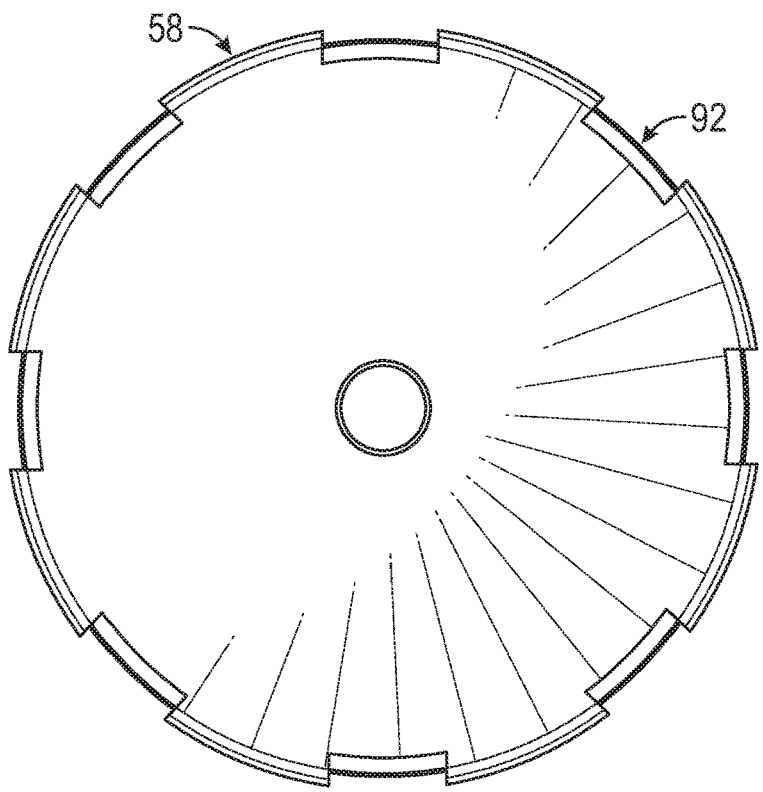
FIG. 5 is an end view of the exhaust plug.

Referring now to FIGS. 4 and 5, the exhaust plug 58 is illustrated in greater detail. The exhaust plug 58 includes a plurality of exhaust plug apertures 92 defined by the exhaust plug 58. The precise number of apertures 92 provided may vary depending upon the particular application of use. In the illustrated embodiment, the apertures 92 are defined by a portion of the axially-extending portion 82 and a portion of the end portion 84. However, it is to be appreciated, that alternative axial locations may be utilized for the apertures 92. The substantially rectangular geometry of the apertures 92 is merely illustrative and alternative shapes may be included.

Figure 6:
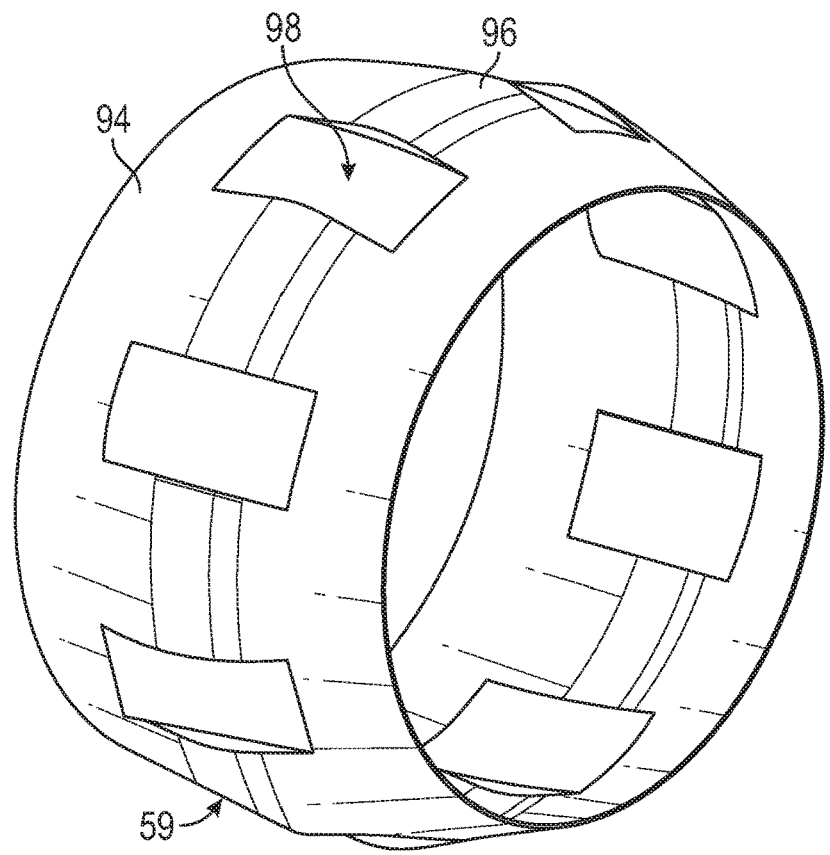
FIG. 6 is a perspective view of an exhaust plug liner.
Figure 7:
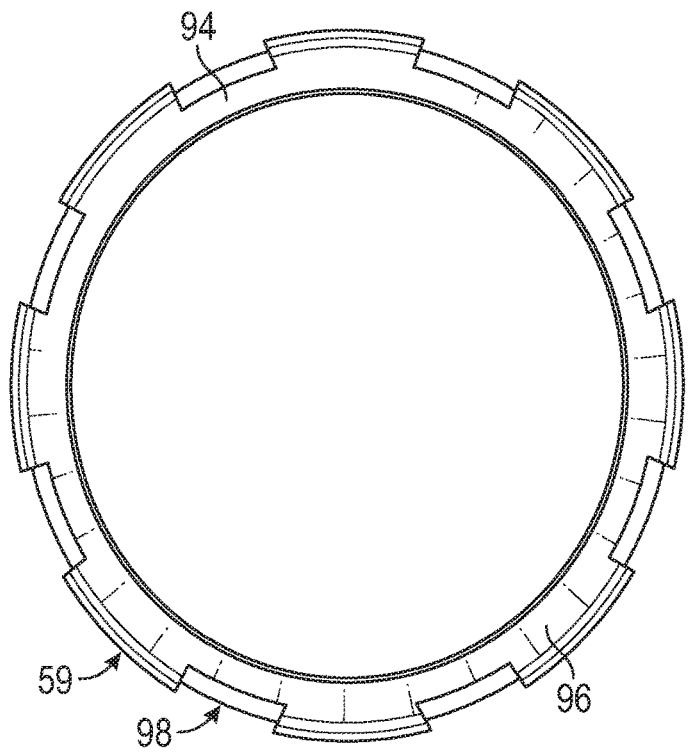
FIG. 7 is an end view of the exhaust plug liner.
Figure 8:
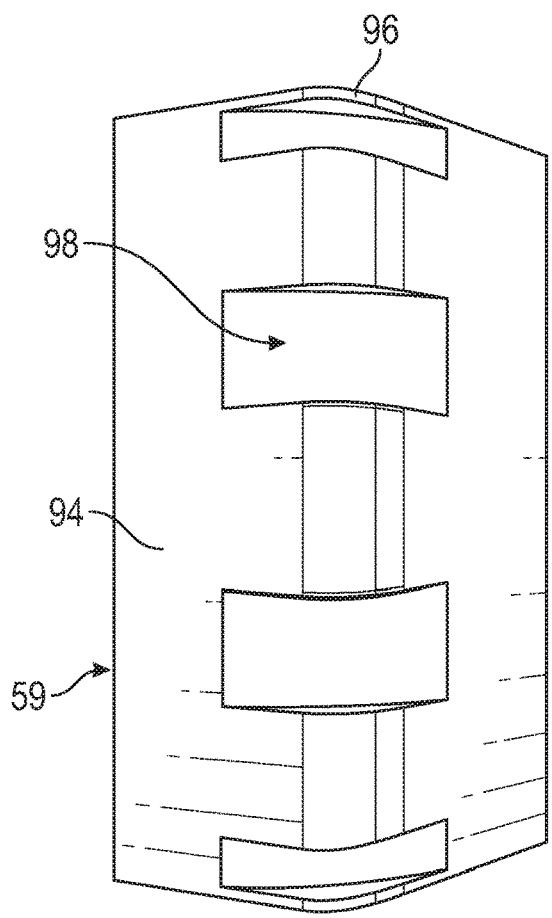
FIG. 8 is a side, elevational view of the exhaust plug liner.
Figure 9:
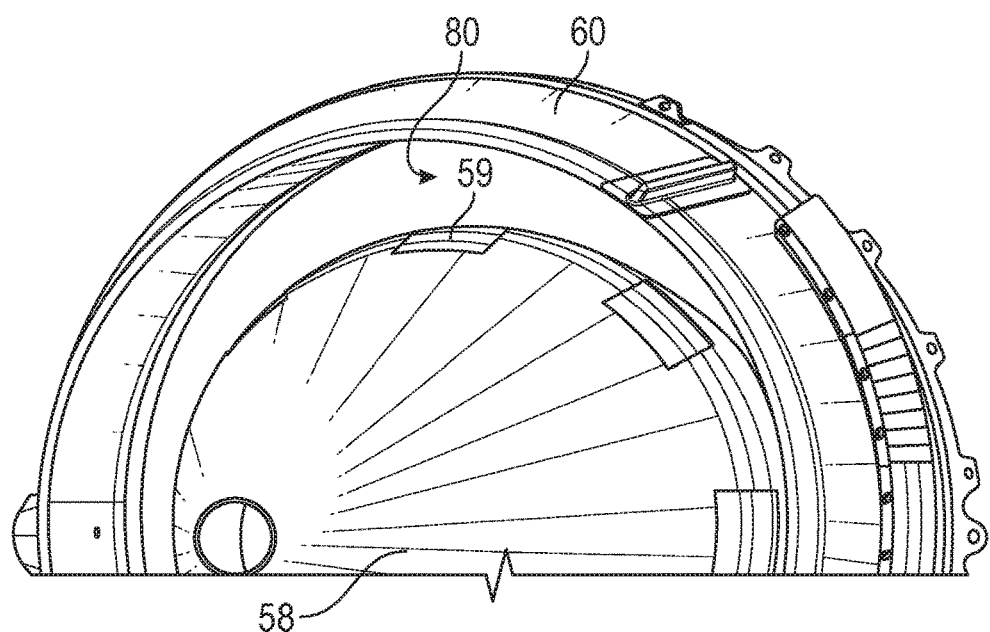
FIG. 9 is a perspective view of the exhaust plug liner in a first rotational position.
Figure 10:
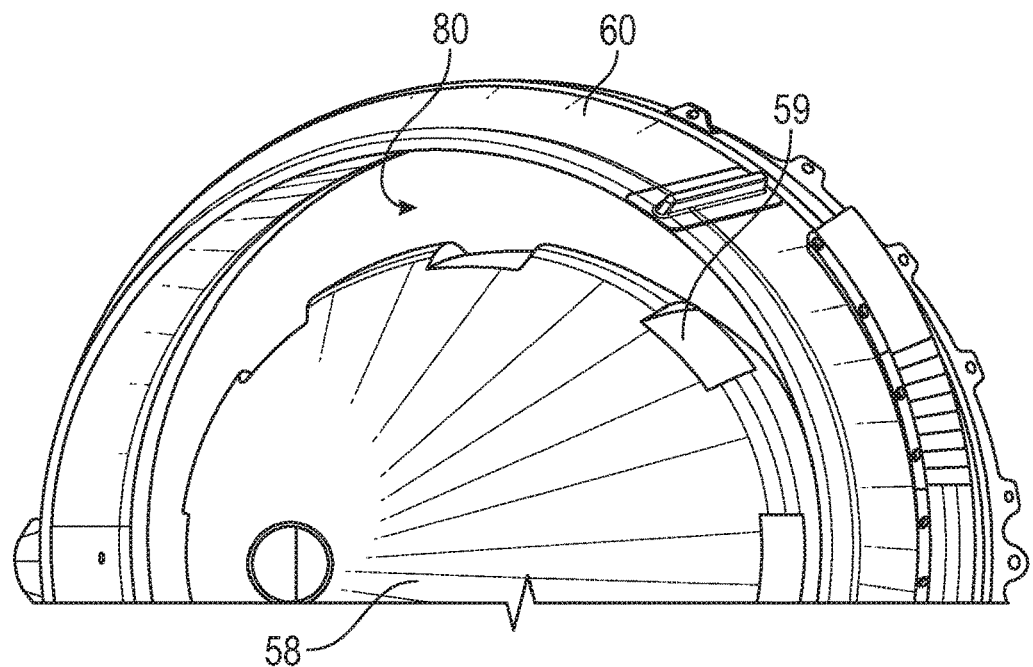
FIG. 10 is a perspective view of the exhaust plug liner in a second rotational position.

Referring now to FIGS. 6-8, an exhaust plug liner 59 is illustrated. The exhaust plug liner 59 includes an outer surface 94 that does not form a uniform perimeter (e.g., radius). In particular, at an axial location of the exhaust plug liner 59, a plurality of protrusions and/or recesses are present and circumferentially spaced from each other. In one embodiment, protrusions 96 are formed and raised from the remainder of the outer surface 94 to form recessed portions 98 between each of the protrusions 96. In another embodiment, only recesses 98 are provided. In yet another embodiment, the liner 59 includes protrusions 96 raised from the outer surface 94 and recesses 98 that are recessed from the outer surface 94. Regardless of the precise configuration of the protrusions 96 and/or recesses 98, the exhaust plug liner 59 includes circumferentially spaced portions at an axial location that provide varying diameters along the outer surface 94 of the liner 59.

Figure 11:
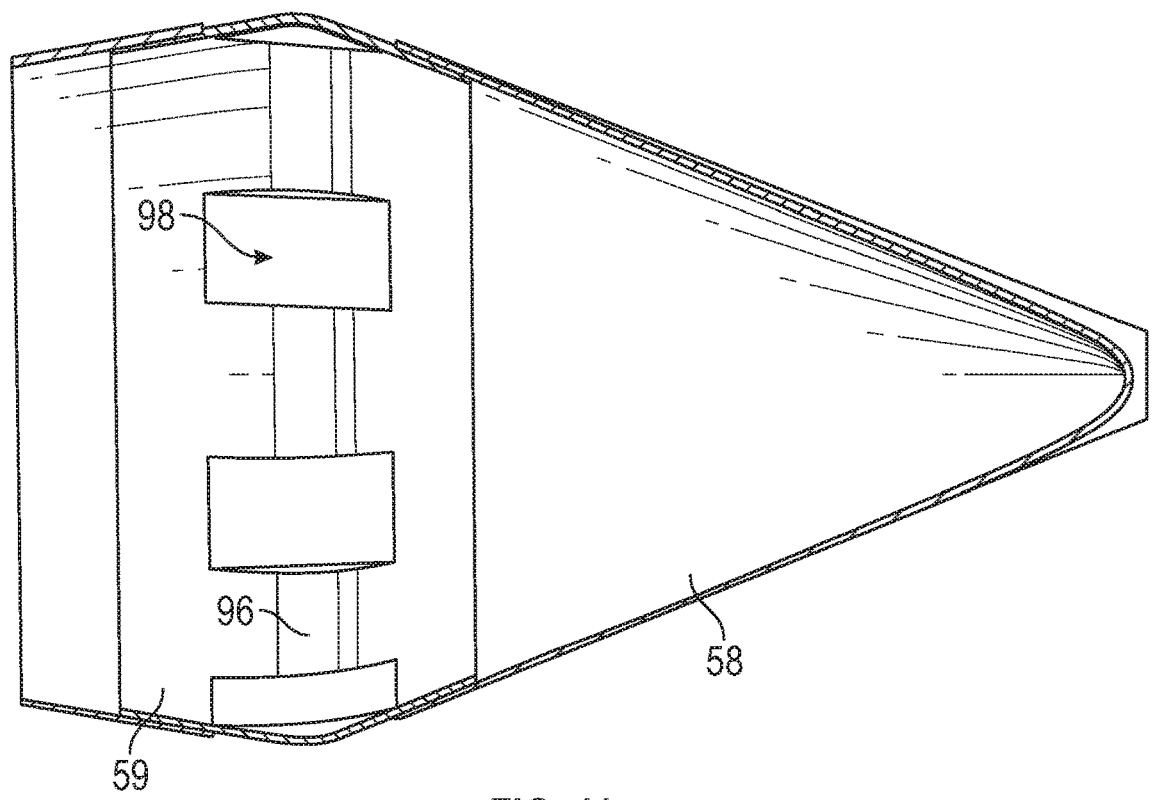
FIG. 11 is a side, elevational view of the exhaust plug liner in the first rotational position.
Figure 12:
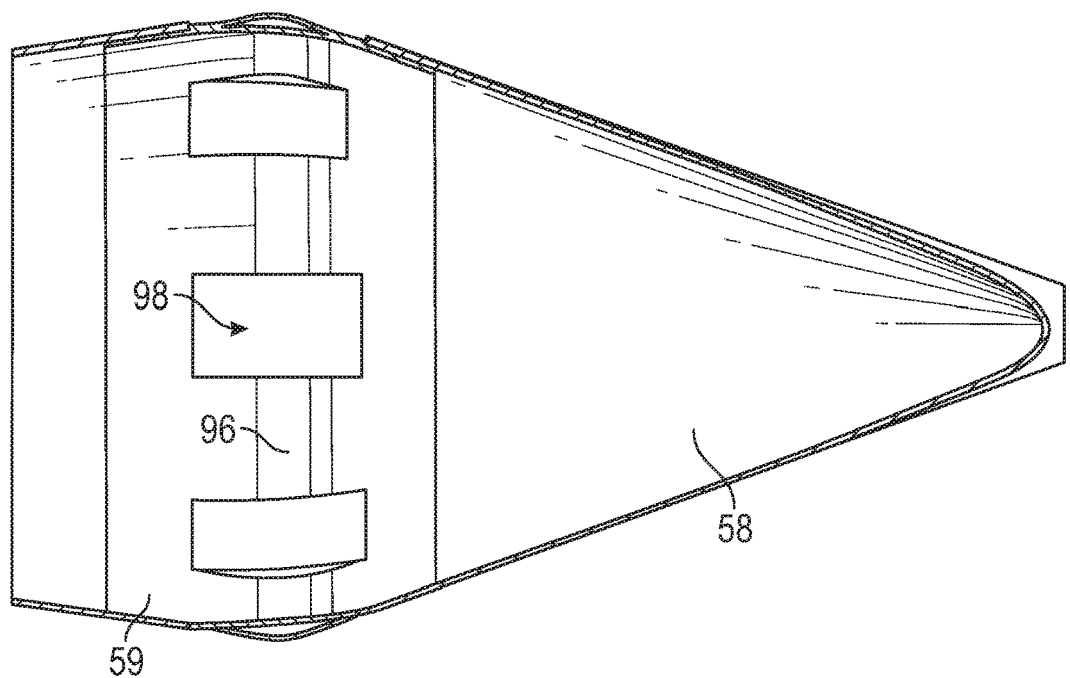
FIG. 12 is a side, elevational view of the exhaust plug liner in the second rotational position.

As shown in FIGS. 9-12, the exhaust plug liner 59 is positioned along an inner surface of the exhaust plug 58 and is rotatable between a first position (FIGS. 9 and 11) and a second position (FIGS. 10 and 12), with FIGS. 11 and 12 having a portion of the exhaust plug 58 removed to illustrate the positioning of the exhaust plug liner 59. In particular, the exhaust plug liner 59 is positioned within the exhaust plug 58 such that the protrusions 96 and/or recesses 98 are axially aligned with the apertures 92 of the exhaust plug 58. The exhaust plug liner 59 rotates in a manner that maintains axial alignment of the apertures 92 (FIG. 4) and the protrusions 96 and/or recesses 98.

The exhaust plug liner 59 is rotatable about the engine central longitudinal axis A relative to the exhaust plug 58, to reposition the protrusions 96 and/or recesses 98. Moving the exhaust plug liner 59 from the first position to the second position increases a cross-sectional area of the exhaust pathway 80. The increase of the cross-sectional area of the exhaust pathway 80 increases the expansion ratio across the turbine section 28, thus resulting in a lower amount of core thrust 62 relative to the fan airflow 70.

Figure 13:
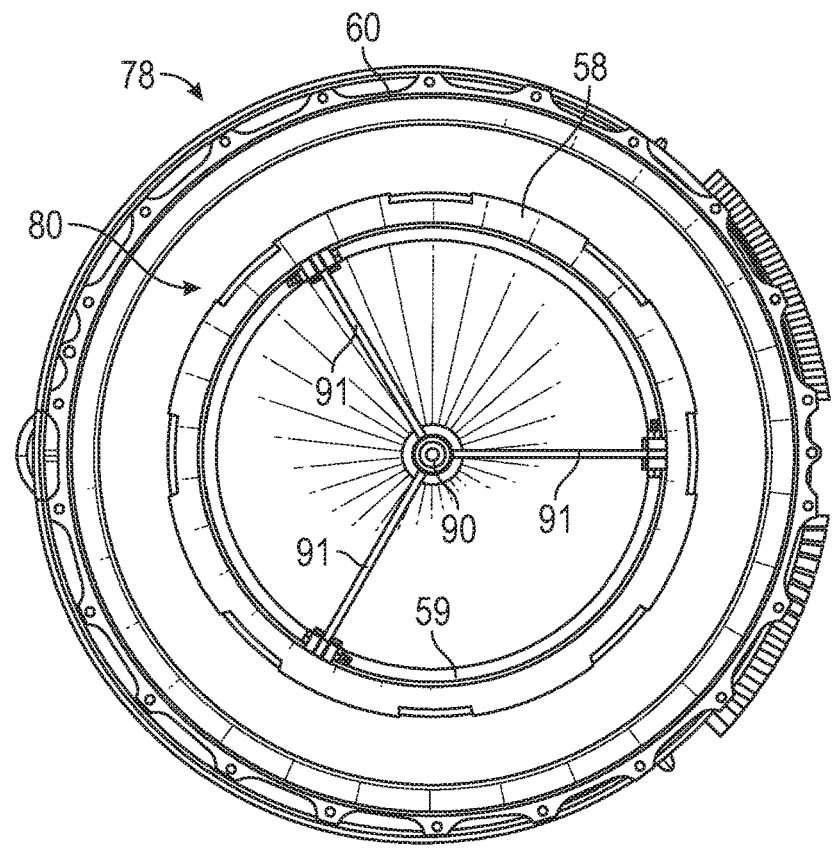
FIG. 13 is an end view of the exhaust section.

Referring to FIG. 13, rotation of the exhaust plug liner 59 may be driven by one or more actuators 90 operatively coupled to the exhaust plug liner 59. In some embodiments, the one or more actuators 90 are pneumatically or electrically driven actuators, to withstand the high temperatures of the exhaust section 78 of the gas turbine engine 10. As shown, the actuator(s) 90 may be located within an interior of the exhaust plug 58 and exhaust plug liner 59, the actuator(s) 90 coupled to the exhaust plug liner 59 via one or more struts 91. Although three struts 91 are shown in the illustrated example, it is to be understood that more or fewer struts may be provided.

In some embodiments, the movement of the exhaust plug liner 59 from the first position to the second position increases the cross-sectional area of the exhaust pathway 80 by up to 20%, in some embodiments in the range of 10% to 20%. A 20% area increase may reduce reverse thrust requirements by a corresponding 20% relative to operation of the thrust reverser 68 with the exhaust plug 58 at the first position.

In accordance with a method of a landing sequence for an aircraft, when the aircraft touches down, the exhaust plug liner 59 is moved from the first position to the second position, thus increasing the cross-sectional area of the exhaust pathway 80. The translating sleeve 72 of the fan thrust reverser 68 is then translated, thus extending the blocker door assemblies 76 across the fan flowpath B, so that when the gas turbine engine 10 is spooled up to an appropriate reverse thrust setting, the fan airflow 70 is diverted through the cascade vanes 74 to slow or stop the aircraft. Certain steps of the method may be interchanged in sequencing or happen simultaneously in some embodiments.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An exhaust section of a gas turbine engine, comprising:
    an exhaust plug defining a plurality of exhaust plug apertures circumferentially spaced from each other;
        an exhaust nozzle radially offset from the exhaust plug defining an exhaust pathway between the exhaust plug and the exhaust nozzle; and an exhaust plug liner having a non-uniform outer surface axially aligned with the exhaust plug apertures;
        wherein the exhaust plug liner is circumferentially rotatable about an engine central longitudinal axis relative to the exhaust plug between a first position and a second position to selectively change a cross-sectional area of the exhaust pathway during thrust reversal operation to reduce an amount of reverse thrust necessary.

2. The exhaust section of claim 1, wherein the non-uniform outer surface of the exhaust plug liner is disposed along a single axial location of the exhaust plug liner.

3. The exhaust section of claim 2, wherein the non-uniform surface comprises at least one of a plurality of protrusions and a plurality of recesses along the outer surface of the exhaust plug liner.

4. The exhaust section of claim 1, wherein the exhaust plug includes an end portion tapering to a plug tip.

5. The exhaust section of claim 4, wherein the end portion is conical.

6. The exhaust section of claim 4, further comprising an axially-extending portion of the exhaust plug extending from the end portion.

7. The exhaust section of claim 6, wherein the axially-extending portion is cylindrical.

8. The exhaust section of claim 1, wherein at least one actuator drives rotation of the exhaust plug liner.

9. The exhaust section of claim 8, wherein the at least one actuator is one or more pneumatic or electric actuators.

10. The exhaust section of claim 1, wherein rotation of the exhaust plug liner between the first position and the second position changes the cross-sectional area of the exhaust pathway by between 10% and 20%.

11. A gas turbine engine comprising:
    a fan section defining a fan airflow pathway;
    a combustor section;
    a turbine section in fluid communication with the combustor section; and
    an exhaust section in fluid communication with the turbine section, the exhaust section including:
        an exhaust plug defining a plurality of exhaust plug apertures circumferentially spaced from each other;
        an exhaust nozzle radially offset from the exhaust plug defining an exhaust pathway between the exhaust plug and the exhaust nozzle; and
        an exhaust plug liner having a non-uniform outer surface axially aligned with the exhaust plug apertures;
        wherein the exhaust plug liner is circumferentially rotatable about an engine central longitudinal axis relative to the exhaust plug between a first position and a second position to selectively change a cross-sectional area of the exhaust pathway during thrust reversal operation to reduce an amount of reverse thrust necessary.

12. The gas turbine engine of claim 11, wherein the non-uniform outer surface of the exhaust plug liner is disposed along a single axial location of the exhaust plug liner.

13. The gas turbine engine of claim 12, wherein the non-uniform surface comprises at least one of a plurality of protrusions and a plurality of recesses along the outer surface of the exhaust plug liner.

14. The gas turbine engine of claim 9, wherein the exhaust plug includes an end portion tapering to a plug tip.

15. The gas turbine engine of claim 14, wherein the end portion is conical.

16. The gas turbine engine of claim 14, further comprising an axially-extending portion of the exhaust plug extending from the end portion.

17. The gas turbine engine of claim 16, wherein the axially-extending portion is cylindrical.

18. The gas turbine engine of claim 11, wherein at least one actuator drives rotation of the exhaust plug liner.

19. The gas turbine engine of claim 11, wherein rotation of the exhaust plug liner between the first position and the second position changes the cross-sectional area of the exhaust pathway by between 10% and 20%.

20. A method of operating a gas turbine engine, comprising:
    actuating a fan thrust reverser to divert a fan airflow from a fan airflow pathway;
    circumferentially rotating an exhaust plug liner about an engine central longitudinal axis, the exhaust plug liner rotation being relative to an exhaust plug, the exhaust plug defining a plurality of exhaust plug apertures circumferentially spaced from each other, and the exhaust plug liner having a non-uniform outer surface axially aligned with the exhaust plug apertures; and
    rotating the exhaust plug liner from a first position to a second position, thereby increasing a cross-sectional area of an exhaust pathway between the exhaust plug and an exhaust nozzle to reduce an amount of reverse thrust necessary;
    the exhaust nozzle radially offset from the exhaust plug defining the exhaust pathway between the exhaust plug and the exhaust nozzle.

* * * * *